(12) United States Patent
Burban et al.

(10) Patent No.: US 6,616,735 B1
(45) Date of Patent: Sep. 9, 2003

(54) COMPRESSED GAS SYSTEMS UTILIZING A VARIABLE PRESSURE MEMBRANE AIR DRIER, AND METHOD OF OPERATION THEREOF

(75) Inventors: John H. Burban, Lake Almo, MN (US); Robert O. Crowder, Little Canada, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 09/710,466

(22) Filed: Nov. 10, 2000

Related U.S. Application Data
(60) Provisional application No. 60/165,135, filed on Nov. 12, 1999.

(51) Int. Cl.[7] .......................... B01D 53/22; B01D 63/02
(52) U.S. Cl. ..................... 96/8; 95/52; 96/10
(58) Field of Search .................. 95/22, 23, 45, 95/52; 96/4, 7, 8, 10

(56) References Cited

U.S. PATENT DOCUMENTS

| | | | | |
|---|---|---|---|---|
| 3,832,830 A | * | 9/1974 | Gerow | 96/8 |
| 4,031,012 A | * | 6/1977 | Gics | 96/8 X |
| 4,261,829 A | * | 4/1981 | Spranger | 96/8 X |
| 4,881,953 A | * | 11/1989 | Prasad et al. | 95/54 X |
| 4,944,776 A | * | 7/1990 | Keyser et al. | 95/52 X |
| 5,030,251 A | * | 7/1991 | Rice et al. | 95/52 |
| 5,084,073 A | * | 1/1992 | Prasad | 95/52 |
| 5,108,464 A | * | 4/1992 | Friesen et al. | 95/52 |
| 5,160,514 A | * | 11/1992 | Newbold et al. | 96/8 |
| 5,259,869 A | * | 11/1993 | Auvil et al. | 95/52 |
| 5,380,433 A | * | 1/1995 | Etienne et al. | 96/8 X |
| 5,411,662 A | * | 5/1995 | Nicolas, Jr. et al. | 96/10 X |
| 5,500,036 A | * | 3/1996 | Kalthod | 95/54 |
| 5,525,143 A | * | 6/1996 | Morgan et al. | 96/10 X |
| 5,605,564 A | * | 2/1997 | Collins | 95/52 |
| 5,961,692 A | * | 10/1999 | Collins | 95/52 X |
| 6,004,383 A | * | 12/1999 | Kuhnelt | 95/52 X |
| 6,296,683 B1 | * | 10/2001 | Koch | 95/52 X |

* cited by examiner

Primary Examiner—Robert H. Spitzer
(74) Attorney, Agent, or Firm—Marshall & Melhorn, LLC

(57) ABSTRACT

A compressed gas system utilizing a membrane air dryer is shown wherein, during unloading, additional sweep gas is provided to the membrane air dryer to prevent excess moisture from being introduced into the accumulator at the end of each unloading cycle. A membrane air drier for use in such system is also described.

21 Claims, 5 Drawing Sheets

COMPRESSED GAS SYSTEMS UTILIZING A VARIABLE PRESSURE MEMBRANE AIR DRIER, AND METHOD OF OPERATION THEREOF

RELATED APPLICATIONS

This application is claiming the benefit, under 35 USC §119(e), of the provisional application filed Nov. 12, 1999, under 35 USC §111(b), which was granted a Ser. No. of 60/165,135. The provisional application, Ser. No. 60/165, 135, is hereby incorporated by reference in its entirety.

BACKGROUND OF THE INVENTION

1. Field of the Invention

The present invention relates generally to the compressed air and gas industry. More particularly, the present invention relates to the use of an apparatus and process for the removal of water from gas streams. Most particularly, this invention relates to an optimized compressed air system and method of operating the same utilizing a membrane air drier for systems which can operate at variable gas pressures with minimal loss of function or efficiency.

2. Discussion of the Related Art

Compressed gas systems generally consist of the following components: a power source, compressor, heat exchanger, particulate filter, aerosol coalescer, air-drier, accumulator, pressure regulator(s), check valves, and the equipment that the gas, such as air, is powering. In many compressed air systems, the compressed air consumption is less than the capacity of the compressor. There are several methods known in the industry to deal with these "excess" compressed air situations.

One procedure is to run the compressor and store the compressed air in an accumulator at high pressure, and then to shut off the motor. A check valve can be placed at the inlet to the accumulator to prevent the stored compressed air from discharging back through the compressor. The motor remains off until the air pressure in the accumulator drops to a pre-set level, at which point the motor restarts and the compressor then refills the accumulator. Although this procedure may reduce energy usage, it is known in the art that frequent start-stop cycles can cause the motor to overheat, and may eventually cause damage to the compressor, motor, or the starting equipment.

An alternate method of control also uses an accumulator to store the compressed air. However, instead of shutting the motor off, a device can be placed in the system that reduces the pressure that the compressor is operating at, and discharges the excess air to atmosphere. One such device is an electrically operated unload solenoid. The pressure in the compressed air system prior to the accumulator is then regulated by the pressure drop across the unload solenoid. This type of control system is often known by the term "constant-run". Such "constant-run" systems are popular, and are especially useful with smaller air compressors. However, such type of systems are prone to problems while the unload solenoid opens the system to atmosphere, as very little water is being removed from the system while the unload solenoid is open, and this can lead to very humid air being reintroduced into the accumulator when the unload solenoid closes.

In an attempt to avoid these problems, systems were developed using compressed air driers between the coalescer and the unloading valve. Such compressed air driers are devices that remove water from a compressed air system, specifically the water that exists in the vapor phase. These devices are generally placed prior to an accumulator to minimize the corrosive effects of moist air on the accumulator, although they can be placed after the accumulator as well. Several types of compressed air driers are known in the art, including refrigeration, desiccant, and membrane driers. Membrane air driers suitable for compressed air systems are known in the art. Several examples of membrane air driers can be found in U.S. Pat. No. 4,783,201 to Rice; U.S. Pat. No. 5,002,590 to Friesen; and U.S. Pat. No. 5,067,971 to Bixson.

Typically, air coming out of a coalescer is at, or near, ambient temperature, and is saturated with water vapor, any droplets of water having been removed by the filter and coalescer. The intent of using the membrane air drier is to remove as much of the water vapor as possible from the air before the compressed air reaches the accumulator. The performance of such air driers, which typically contain a membrane module, is measured in terms of the dewpoint suppression achieved as air passes through the module. The dewpoint is the temperature at which moisture will start to condense out of the moist air. Dewpoint suppression is how many degrees the dew point is lowered as the air passes through the drier.

The dewpoint suppression is a function of the membrane area, feed flow rate, operating pressure and temperature, and sweep fraction. The membrane air driers known in the art generally function by contacting one side of a semi-permeable membrane with a pressurized wet feed stream which is coming from the coalescer. The membrane is chosen such that it preferentially allows water vapor to permeate faster than the feed gas that is being dehydrated. A portion of the dried gas, as will be explained further herein below, and known in the art as the "sweep", is depressurized and fed back to contact the other side of the membrane, and acts to drive away the water moisture that has permeated the membrane.

The sweep of many membrane air driers is controlled by the use of an externally mounted valve or an internal orifice, and is usually factory preset for a given application. Membrane modules with externally mounted valves can be manually adjusted in service. However, there exists no means for cost effective automatic adjustment of the sweep based on the module feed conditions. Thus, for most purposes modules with externally mounted valves can be considered as fixed sweep modules, just like the internal orifice modules.

With fixed sweep membrane modules, the amount of sweep air is proportional to the operating pressure. Generally for fixed sweep modules operating before the accumulator in compressed gas systems utilizing an unload solenoid, the dewpoint suppression of the membrane module decreases when the unload solenoid opens, and the compressed gas flows through the membrane module at a lower pressure. This situation leads to higher humidity in the compressed air system between the membrane module inlet and the unload solenoid, and can lead to condensation when the unload solenoid closes and the entire system again increases in pressure. Some in the art have tried to prevent this condensation by appropriately sizing the fixed orifice membrane module for the low pressure condition when the unload solenoid is open. However, a significant disadvantage of this solution is that at normal operating pressures, the membrane module would be over designed and the sweep would be a much larger fraction of the feed gas than is necessary, leading to high operating costs. Thus, those in the field of compressed gas drying continue to try to optimize the design of membrane driers when they are used in gas circuits where the compressor duty is controlled by an unload solenoid placed downstream of the compressor.

SUMMARY OF THE INVENTION

The present invention provides a novel method for unloading compressed gas systems, as well as a novel membrane air drier which works under varying pressure without loss of drying efficiency, and the attendant problems of condensation attendant thereto.

In one embodiment of the present invention, a compressed gas system is provided with an accumulator having an inlet and an outlet; an unload solenoid having an inlet, a first outlet in communication with said inlet when said unload solenoid is open and a second outlet in fluid communication with said inlet when said unload solenoid is closed; and a membrane air dryer having an inlet and an outlet, the outlet of said membrane air dryer in fluid communication with said inlet of said unload solenoid; said membrane air dryer having a sweep inlet and a sweep outlet, said outlet of said unload solenoid which is in fluid communication with said inlet of said unload solenoid when said unload solenoid is open being in fluid communication with the sweep air inlet.

In a further embodiment of the invention, a compressed air system is provided which has seriatim, downstream of the compressor, all in fluid communication, an after cooler, a filter, a coalescer, a membrane air drier, an unload solenoid, and a receiver/accumulator. The unload solenoid, when opened, is in fluid communication with the sweep inlet of the membrane air drier.

In another embodiment of the present invention, a membrane air dryer is provided having an air inlet, an air outlet, a sweep inlet, and a sweep outlet.

Thus, one of the objects of the present invention is to provide an improved method of operation for a compressed gas system.

Another object of the present invention is to provide an improved compressed gas or air system having a membrane air drier which has minimal loss of efficiency when operated at varying pressures.

A still further object of the present invention is to have a membrane air drier in fluid communication with a receiver/accumulator through an unload solenoid, and to have the unload solenoid unload directly into the sweep inlet of the membrane air drier.

Further objects and advantages of the present invention will be apparent from the following description and appended claims, reference being made to the accompanying drawings forming a part of the specification, wherein like reference characters designate corresponding parts in the several views.

It is to be understood that the specific devices and processes illustrated in the attached drawings, and described in the following description, are simply explanatory embodiments of the inventive concepts defined in the appended claims. Hence, specific dimensions and other physical characteristics relating to the embodiments disclosed herein should not be considered as limiting unless the claims expressly state otherwise.

DETAILED DESCRIPTION OF THE INVENTION

Figure 1:
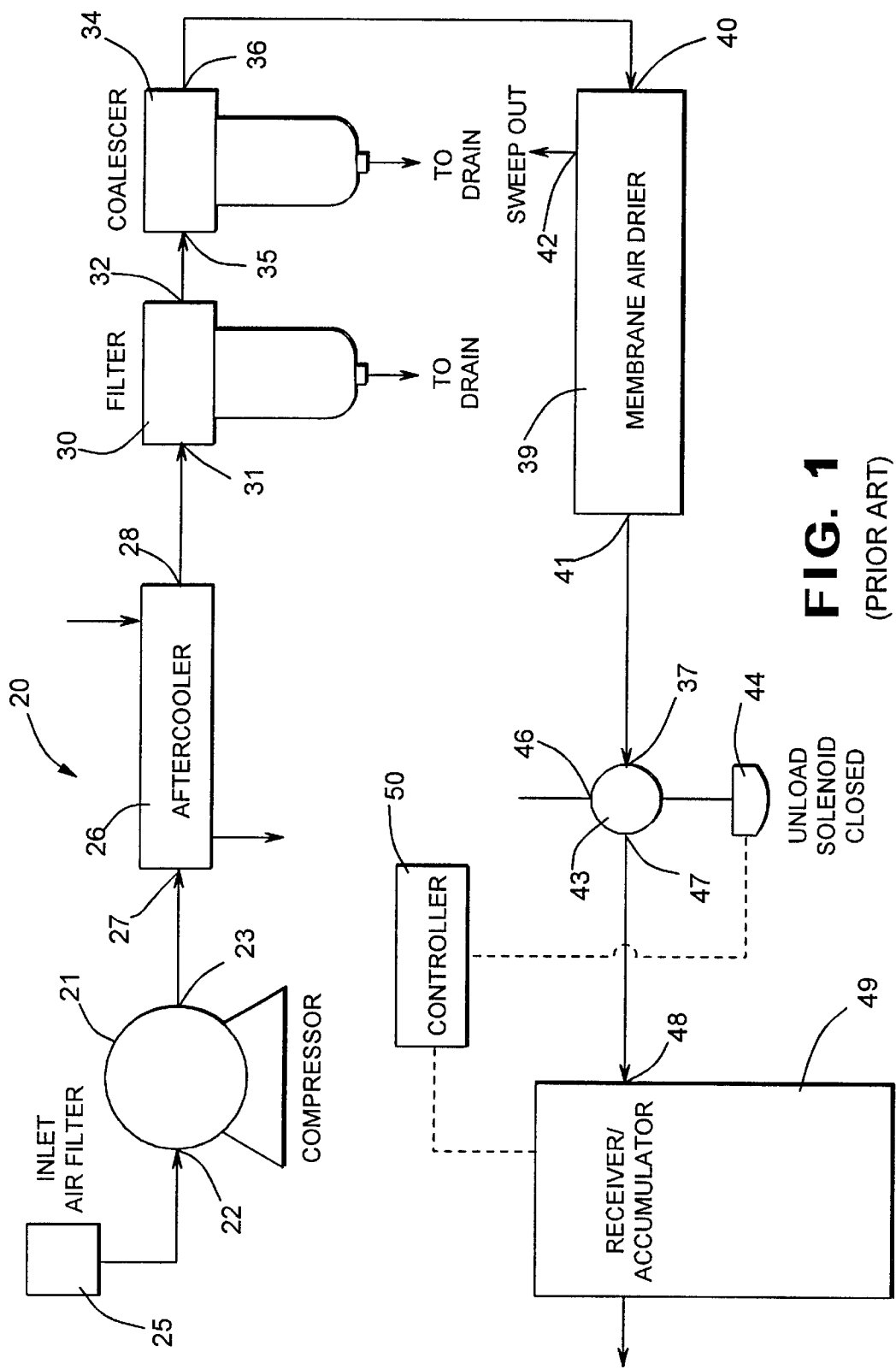
FIG. 1 is a diagrammatic view of a known compressed air system with the unload solenoid closed.

Referring now to FIG. 1, there is shown a typical compressed gas system 20. There is shown a compressor 21 having an inlet 22 and an outlet 23. An inlet air filter is in fluid communication with the inlet 22 of compressor 21. Next is provided an after cooler 26 having an inlet 27 and an outlet 28. The inlet 27 of after cooler 26 is in fluid communication with the outlet 23 of air compressor 21 to receive the compressed air and cool the same.

To remove water droplets and particulates from the cooled compressed air there is provided a filter 30 having an inlet 31 and an outlet 32. The inlet 31 of the filter 30 is in fluid communication with the outlet 28 of the aftercooler 26.

To remove additional water from the compressed air, a coalescer 34 is provided downstream of the filter 30. The inlet 35 of the coalescer 34 is in fluid communication with the outlet 32 of the filter 30. By the time the compressed air has passed through the filter 30 and the coalescer 34, all the larger water droplets have been removed and the air is preferably at, or near, ambient temperature and is saturated with water vapor (100% relative humidity).

To remove the water vapor from the compressed air, and to suppress the dew point of the air going into the receiver/accumulator 49, a membrane air drier 39 is provided having an inlet 40 and an outlet 41. The inlet 40 of the air drier is in fluid communication with the outlet 36 of the coalescer 34. It should be understood that many types of air driers are available in the prior art, and could be used in place of the membrane air drier 39. However, for purposes of illustration, a membrane air drier is shown which is of the internal sweep type, as will be explained more fully in regard to FIG. 4. It can be understood by those skilled in the art that some of the air passing into inlet 40 of the membrane air drier, instead of passing out through outlet 41, is depressurized internally and passes back over the outside of the membrane(s) in the membrane air drier 39 and passes out the sweep out outlet 42. This sweep gas passing over the outside of the membrane(s) removes the vapor which has permeated through the membranes, thus reducing the dew point and the relative humidity of the air passing out the air drier outlet 41.

Downstream of the air drier 39 is a solenoid valve 43 operated by unload solenoid 44. Solenoid valve 43 has a first outlet 46 and a second outlet 47. When unload solenoid 44 is closed, as illustrated in FIG. 1, the inlet 37 of solenoid valve 43 is in fluid communication with the second outlet 47. Thus, compressed air coming from the membrane 39 enters the inlet 37 of solenoid valve 43 and passes out the second outlet 47 into the inlet 48 of the receiver/accumulator 49. Unload solenoid 44 is in electrical communication with the controller 50. The controller 50 is also in electrical communication with a pressure sensor (not shown) in the receiver/accumulator 49. The controller 50 opens and closes the unload solenoid 44 in response to changes in pressure in the receiver/accumulator.

Figure 2:
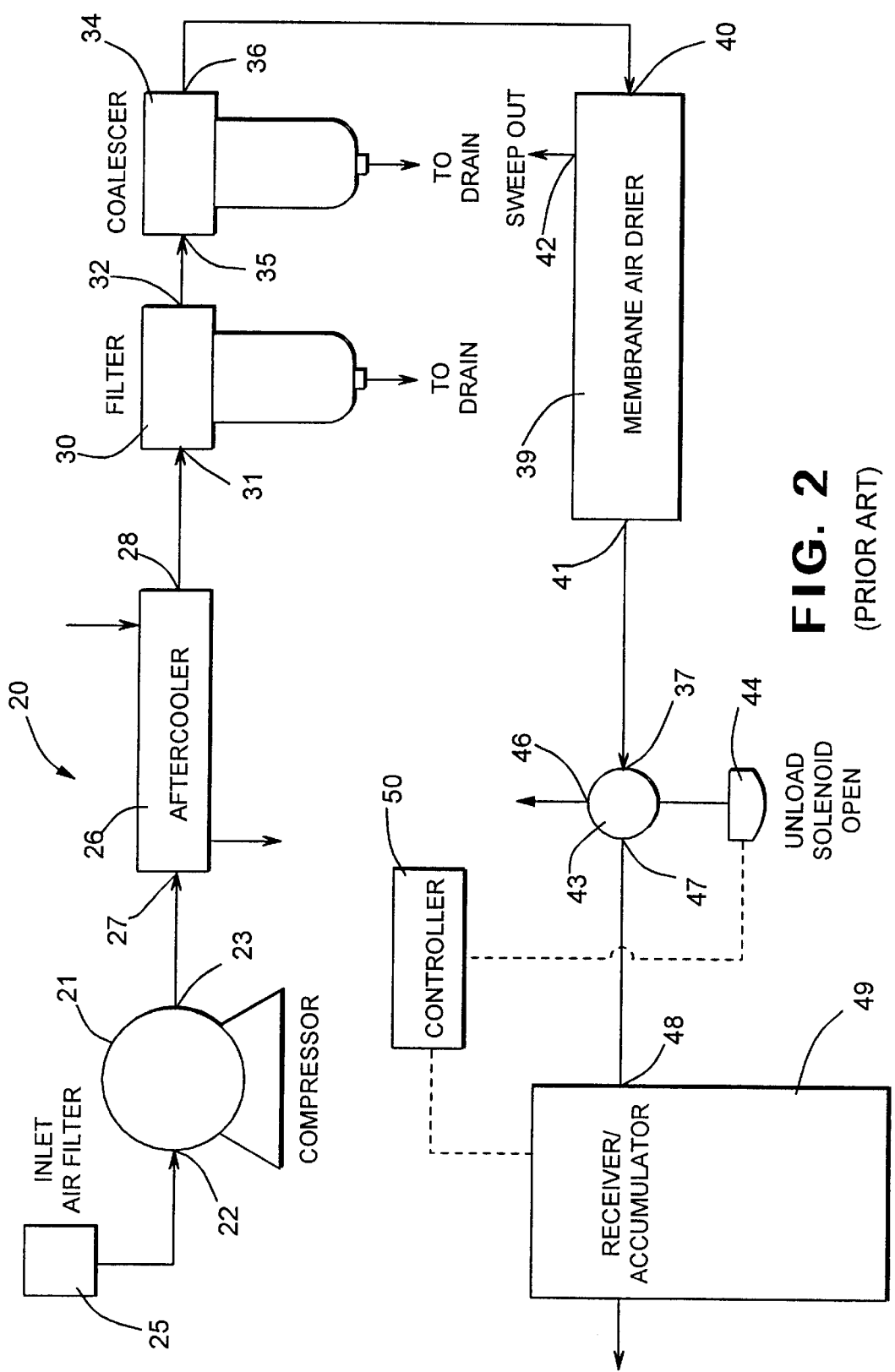
FIG. 2 is a diagrammatic view of the compressed air system shown in FIG. 1 with the unload solenoid opened.

Referring now to FIG. 2, when the controller 50 senses that the pressure in the receiver/accumulator 49 has reached the desired level, a signal is sent to the unload solenoid 43, causing it to open. The second outlet 47 of the solenoid valve 43 is closed, and the first outlet 46 is opened, venting the compressed air to atmosphere. This venting of the compressed air to atmosphere immediately lowers the air pressure in the remainder of the system, for example, from 100 psi to 50 psi. (These numbers will vary widely depending on the particular application.) This causes the volumetric flow rate of the internal sweep gas in the membrane air drier 39 to lessen, causing very little water vapor to be removed from the air entering the inlet 40 of the membrane air drier 39 from the outlet 36 of the coalescer.

As the membrane air drier adjusts to this new low pressure condition, the amount of water vapor in the compressed air increases over time. There will be no problem as long as the unload solenoid 44 remains open. The problem comes about when the unload solenoid 44 receives a signal from the controller 50 and closes solenoid valve 43. The air flow resumes in a manner as shown in FIG. 1. With high relative humidity, this air again enters the receiver/accumulator 49 through the inlet 48, and condensation, which may have even begun in the membrane air drier 39, increases as the pressure in the receiver/accumulator 48 increases. The presence of condensed water in the receiver/accumulator 49 is very corrosive over time, and can cause serious problems. Thus, while the system shown in FIGS. 1 and 2 will operate satisfactory for a time eventually serious problems may occur.

Figure 3:
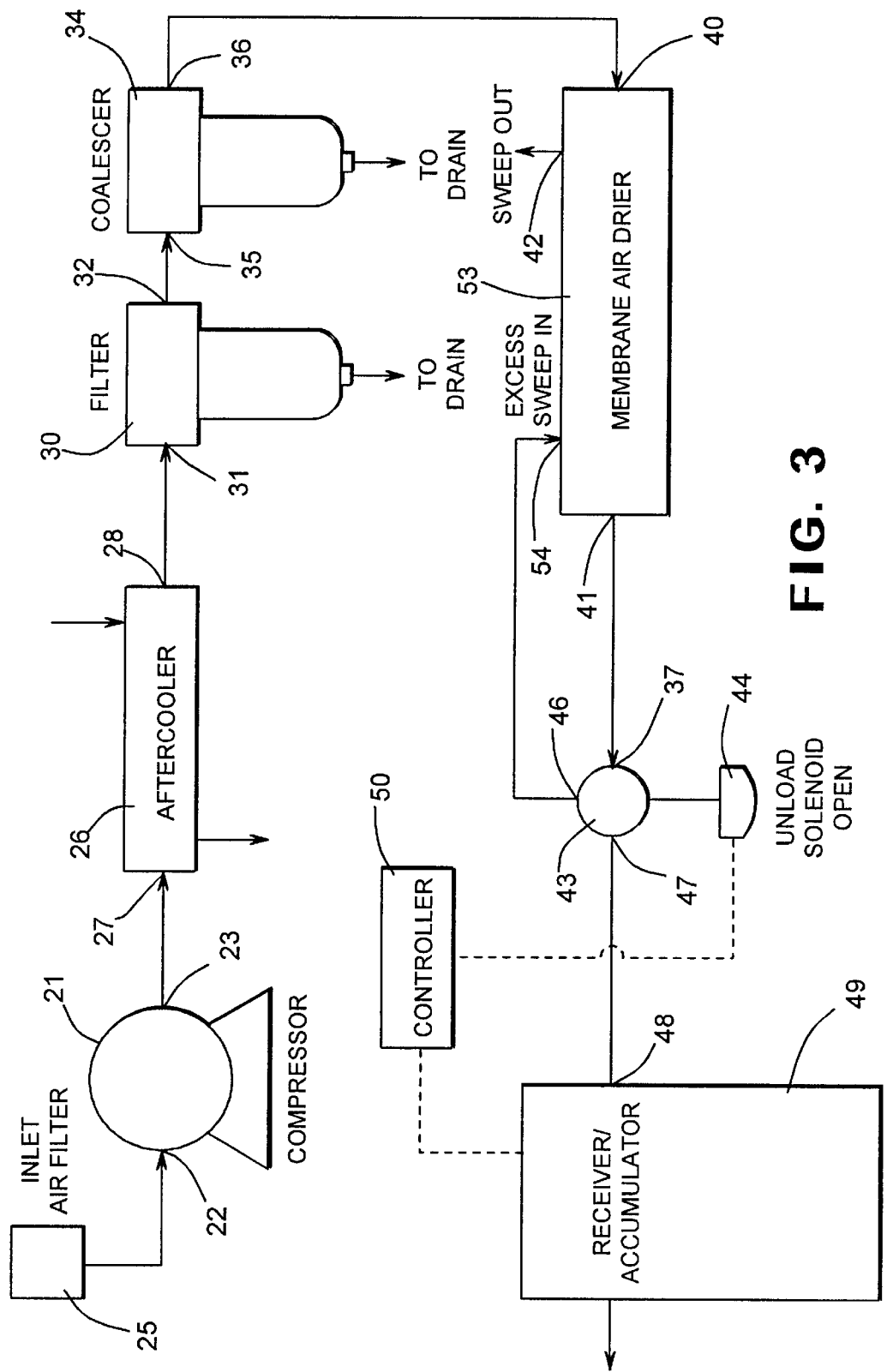
FIG. 3 is a diagrammatic view of a construction embodying the present invention with the unload solenoid open.

In order to solve the problems present in the prior art system, we developed the system and method and apparatus disclosed in FIG. 3. The improved membrane air dryer, now identified by the numeral 53, has an inlet 40, an outlet 41, and a sweep air outlet 42 as do the prior art air dryers. In addition, it has a sweep inlet 54 in fluid communication with the sweep outlet 42. The first outlet 46 of solenoid valve 43 is no longer open to atmosphere, but is in fluid communication with the excess sweep inlet 54 of the improved membrane air dryer 53. When the unload solenoid 44 is open, the improved membrane air dryer 53 operates as does the known membrane air dryer 39 illustrated in FIG. 2. As air passes through the inlet 40, through the air dryer 39, and out the outlet 41, some of the gas coming in the inlet 40 is depressurized internally and flows over the outside of the membranes contained within the air dryer 53, thus removing water vapor and passing it out the sweep out outlet 42. However, when the unload solenoid 44 is closed, the first outlet 46 is not open to atmosphere as in the prior art compressed gas systems, but instead is in fluid communication through sweep inlet 54 with tile sweep outlet 42, and thus there is more sweep gas available inside the improved membrane air dryer 53 when the compressed gas system 20 is unloaded, and therefore the problems with condensation during unloading which were previously discussed, are no longer present.

Figures 4, 5:
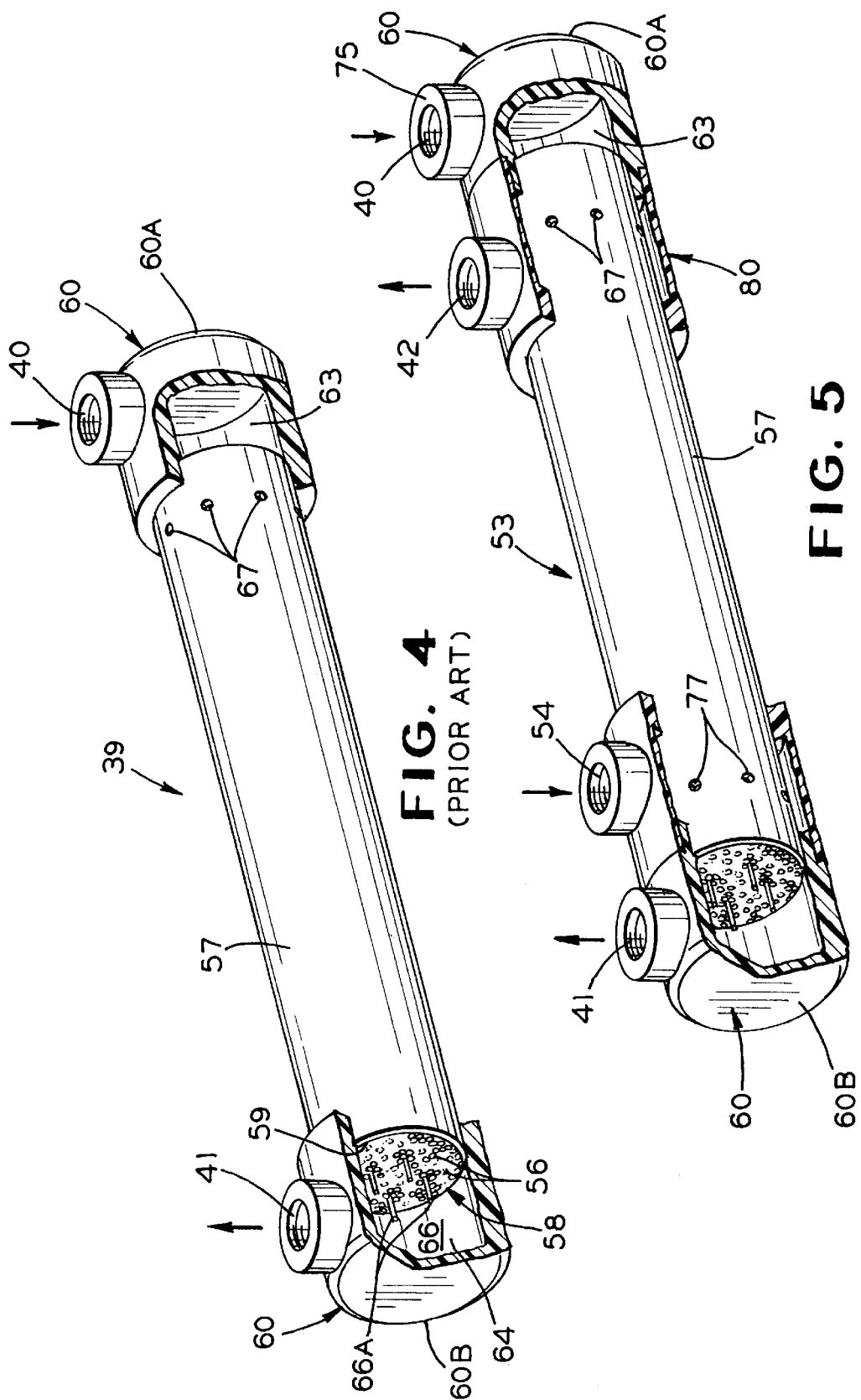
FIG. 4 is a fragmentary perspective view of a known membrane air drier.
FIG. 5 is a fragmentary perspective view of an air drier construction embodying the present invention.

Referring to FIG. 4, the known membrane air drier 39 comprises a hollow shell or tube 57 which contains a bundle 58 of hollow fibers 56 chosen so they preferentially allow water vapor to permeate faster than the feed gas that is being dehydrated. The bundle 56 of hollow fibers 58 is sealed by potting compound 59 at both ends so that the interiors of the hollow fibers 56 in the hollow fiber bundle 58 cannot communicate with the exterior of the hollow fibers 56.

Each end of the shell 57 is closed by an endcap 60 which may be identical. The upstream or inlet endcap 60A has an inlet 40, and the downstream or outlet endcap 60B has an outlet 41. Endcaps 60 are affixed to the shell 57 by means well-known in the art so as to create an inlet plenum 63 and an outlet plenum 64. Inlet 40 is in fluid communication with inlet plenum 63, and outlet 41 is in fluid communication with outlet plenum 64. A sweep inlet is provided by a plurality of small hollow tubes 66A which are potted into the outlet end of the bundle 58 of hollow fibers 56 and provide fluid communication between the outlet plenum 64 and the outside of the hollow fibers 56 forming a part of the hollow fiber bundle 58. The small hollow tubes 66A comprising the sweep inlet 66 pass through the potting compound at the outlet end of the bundle 58 for a short distance to ensure fluid communication. It can be seen that when the membrane air drier 39 is pressurized and in operation, since the exterior of the fibers 56 comprising the hollow fiber bundle 58 are in fluid communication with the atmosphere through a plurality of parametrically spaced holes 67 in shell 57, the pressure difference between outlet plenum 64 and the atmosphere will cause a continuous flow of air from the outlet plenum 64 through the sweep inlet tubes 66A, and out the sweep outlet 67, thereby removing the water vapor which has permeated through the wall of the hollow fibers making up the hollow fiber bundle and providing receiver/accumulator air through the outlet plenum 64.

However, when the outlet 41 of membrane air drier 39 is opened to atmosphere by the unload solenoid 44 being in its open position, the pressure present throughout the system, including that present in the membrane air drier 39, drops substantially from, for example, 100 pounds per square inch to perhaps 50 pounds per square inch. This drop in pressure causes such a low-pressure differential that virtually no gas is forced back through the sweep inlet 66, almost no water vapor is removed from the air stream passing through the membrane air drier 39, and the humidity in the air passing through the air drier 39 starts increasing over time, causing the aforementioned problems.

Figure 6:
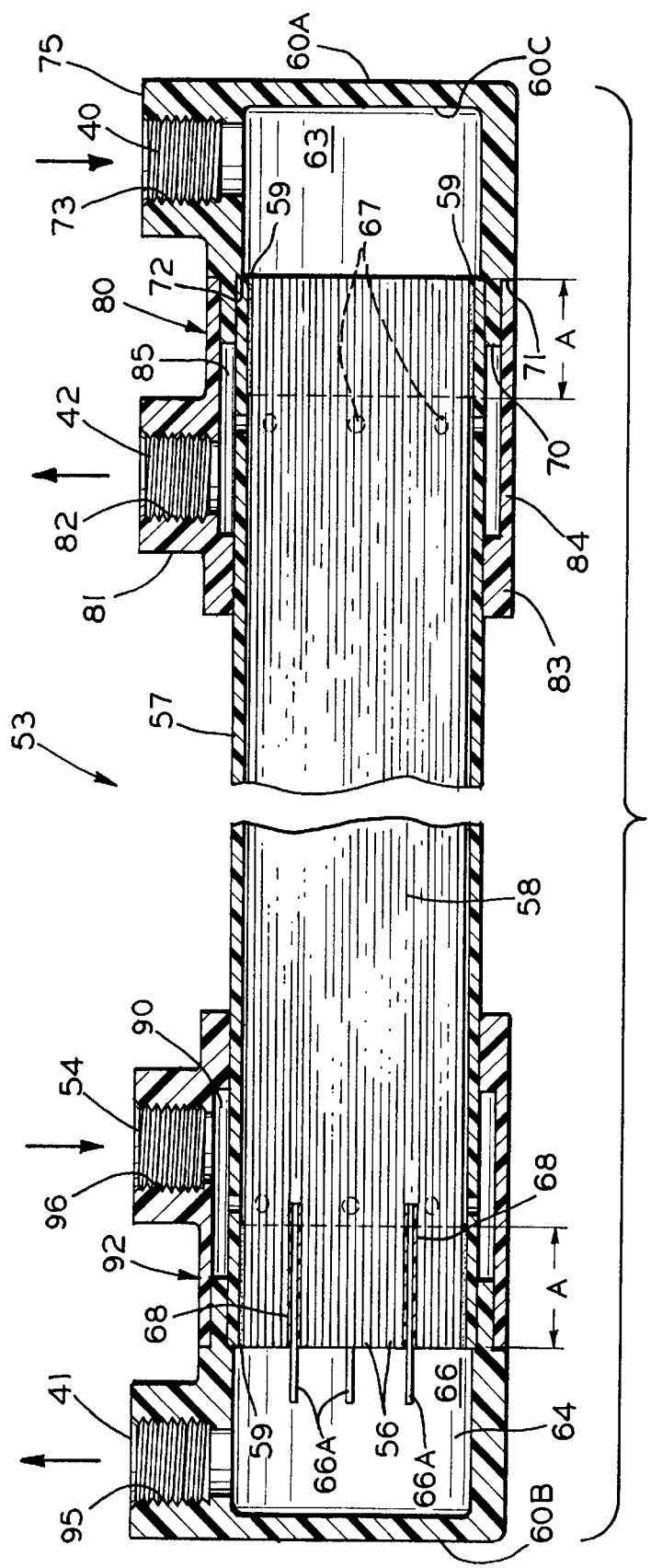
FIG. 6 is an elevational sectional view of the construction shown in FIG. 5.

To solve these problems, the construction shown in FIGS. 5 and 6 was developed for use in the system shown in FIG. 3. The construction of the improved membrane air drier 53 is shown in detail in FIG. 6. As before, a hollow tube or shell 57 surrounds, and may be co-extensive, with a hollow fiber bundle 58 made with a plurality of hollow fibers 56. Potting compound 59 is used at each end of the hollow fiber bundle 58 to seal the ends of the bundle for a finite distance A, and prevent any fluid communication between the interior surfaces of the hollow fiber 56 and the exterior surfaces. At the outlet end of the hollow fiber bundle 58, a selected plurality of short hollow fibers 68 are potted into the potting compound 59. Short hollow fibers 68 may be substantially even with the outlet end of the hollow fiber bundle 58, and extend a short distance past the other end of the potting compound 59 to provide fluid communication with the outside surfaces of the hollow fibers 56.

Into the short hollow fibers 68 will be inserted sweep inlet needles, orifices, or tubes 66A, which form the sweep gas inlet 66. The hollow tube or shell 57 which surrounds the hollow fiber bundle 58 will be closed at its inlet end by an upstream endcap 60A and at its downstream end by the downstream endcap 60B. At its open end, upstream endcap 60A will have a narrowed wall portion 70 formed by providing an outer parametric groove 71 and an inner parametric groove 72 about the periphery of endcap 60A. The inside diameter of inner parametric groove 72 will be substantially the same as the outer diameter of the shell 57, and will be of a depth chosen so that when the end of shell 57 abuts the bottom of the inner parametric groove 72, a stop will be provided permitting the formation of the inlet plenum 63 between the end of the fiber bundle 58 and the endwall 60C of the upstream endcap 60A. A threaded opening 73 will be provided centrally of the boss 75 and will serve as the inlet 40.

Immediately adjacent to the upstream endcap 60A is provided the sweep collar 80. Sweep collar is tubular in shape, and has a second boss 81 provided thereon, with a second threaded opening 82 comprising the sweep outlet 42. The sweep collar has an annular portion 83 having an inside diameter substantially the same as the outside diameter of the shell 57, and a sidewall portion 84 having an inner diameter substantially the same as the outer diameter of the narrow wall portion 70 of the upstream or inlet endcap 60A.

It can be seen that the sweep collar 80 fits into the outer parametric groove 71 of the endcap 60A when assembled to the shell 57 and the endcap 60A. The bottom of the narrow wall portion 70 of the inlet endcap 60A and the annular portion 83 of the sweep collar 80 will form a ring-shaped sweep plenum 85 interiorly between the sweep collar 80 and the shell 57. A plurality of sweep outlet openings 67 in shell 57 will provide fluid communication between the outsides of the hollow fibers 56, through the sweep plenum 85, and the second threaded opening 82, and out the sweep outlet 42.

At the outlet end of the shell 57, a similar construction is provided to form outlet plenum 64 and sweep inlet plenum 90. Downstream or outlet endcap 60B is substantially identical to inlet endcap 60A, and sweep inlet collar 92 is constructed essentially the same as sweep outlet collar 80. A third threaded opening 95 provides fluid communication between the outlet 41 and the outlet plenum 64. A fourth threaded opening 96 provides fluid communication between the sweep inlet 54 through sweep inlet openings 77, to the exterior of hollow fibers 56 forming bundle 58. It can be seen that during normal operation some of the air will be passed back through the sweep inlet 66 to circulate on the outsides of the hollow fibers 56 and remove water vapor that has permeated through fibers 56 and allow it to travel out of sweep outlet 42.

However, in the present invention, in contrast to known systems, when the solenoid valve 43 opens, there is no loss of sweep gas volumetric flow rate to cause the sweep action to slow. Instead, as shown in FIG. 3, the first outlet 46 of the solenoid valve 43 is in fluid communication with the sweep inlet 54 and causes additional sweep air to enter sweep inlet 54 and surround the outsides of the hollow fibers 56 and continue to remove permeate as, or more, efficiently than before unloading, resulting in a much lower relative humidity during unloading than was available in prior art compressed gas systems.

Therefore, by carefully studying the operation of known air driers and compressed gas systems, I have developed a novel compressed gas system. A method of operating the same, and an improved membrane air drier for use therein.

What is claimed is:

1. A compressed gas system comprising:
    a) a compressor having an inlet and an outlet,
    b) an aftercooler having an inlet and an outlet, said inlet of said aftercooler connected to said outlet of said compressor,
    c) a filter having an inlet and an outlet, said inlet of said filter connected to said outlet of said aftercooler,
    d) a coalescer having an inlet and an outlet, said inlet of said coalescer connected to said outlet of said filter,
    e) a membrane air dryer having an inlet, an outlet, a sweep inlet, and a sweep outlet, said inlet of said membrane air dryer connected to the outlet of said coalescer,
    f) a solenoid valve having a solenoid valve inlet, a first outlet, and a second outlet, said solenoid valve inlet being connected to said membrane air dryer outlet, and said first outlet being connected to said membrane air dryer sweep inlet,
    g) an unload solenoid connected to said solenoid valve to selectively direct flow to either said first outlet or said second outlet,
    h) an accumulator having at least an inlet, said accumulator inlet being connected to said second outlet of said solenoid valve, and
    i) a controller electrically connected to both said accumulator and said unload solenoid to move said solenoid valve between a closed position wherein the inlet of said solenoid valve is in fluid communication with said second outlet of said solenoid valve, thereby causing gas flowing into said inlet of said unload solenoid valve to flow into said accumulator, and an open position wherein the inlet of said solenoid valve is in communication with said first outlet, whereby flowing into said inlet of said unload solenoid valve to flow through said first outlet and into said sweep inlet of said membrane air dryer.

2. The compressed gas system according to claim 1, wherein said sweep inlet of said membrane air dryer is in fluid communication with said sweep outlet of said membrane air dryer.

3. The compressed gas system according to claim 1, further comprising an inlet air filter connected to said inlet of said compressor.

4. The compressed gas system according to claim 1, further comprising at least one membrane in said membrane air dryer.

5. The compressed gas system according to claim 4, wherein gas enters the membrane air dryer through said membrane air dryer inlet, and a portion of the gas entering said membrane air dryer is depressurized and is directed over said at least one membrane to remove water vapor from said gas, and is directed to said sweep outlet of said membrane air dryer.

6. The compressed gas system according to claim 1, wherein said solenoid valve is configured to provide additional sweep gas to said membrane air dryer upon said solenoid valve being in said open position, to minimize condensation in said accumulator.

7. A compressed gas system comprising a membrane air dryer and a solenoid valve, said membrane air dryer comprising:
    a) a shell,
    b) a bundle of hollow fibers sealing mounted within said shell so that the interior of said hollow fibers is blocked from fluid communication with the exterior of said hollow fibers,
    c) a first endcap sealingly mounted at one end of said shell to provide a first plenum adjacent a first end of said bundle of hollow fibers, said first endcap having an inlet in fluid communication with said first plenum,
    d) a second endcap sealingly mounted at one end of said shell to provide a second plenum adjacent a second end of said bundle of hollow fibers, said second endcap having an outlet in fluid communication with said second plenum, and said second plenum being in fluid communication with the interior of said hollow bundle.
    e) a sweep outlet in fluid communication with the exterior of said hollow bundle adjacent said first endcap, and
    f) a sweep inlet in fluid communication with the exterior of said hollow bundle adjacent said second endcap,
said solenoid valve having an inlet and first and second outlets, said inlet being in fluid communication with said outlet of said second endcap of said membrane air dryer and one of said outlets being in fluid communication with said sweep inlet of said membrane air dryer, said solenoid valve being configured to direct flow to either of said first and second outlets.

8. A membrane air dryer comprising:
   a) a shell,
   b) a bundle of hollow fibers sealing mounted within said shell so that the interior of said hollow fibers is blocked from fluid communication with the exterior of said hollow fibers.
   c) a first endcap sealingly mounted at one end of said shell to provide a first plenum adjacent a first end of said bundle of hollow fibers, said first endcap having an inlet in fluid communication with said first plenum,
   d) a second endcap sealingly mounted at one end of said shell to provide a second plenum adjacent a second end of said bundle of hollow fibers, said second endcap having an outlet in fluid communication with said second plenum, and said second plenum being in fluid communication with the interior of said hollow bundle,
   e) a sweep air outlet in fluid communication with the exterior of said hollow bundle adjacent said first endcap, and
   f) a sweep inlet in fluid communication with the exterior of said hollow bundle adjacent said second endcap, and
   g) an excess sweep inlet providing fluid communication between an external source of sweep air and the interior of the hollow fiber bundle adjacent said second endcap, and in fluid communication with the exterior of said hollow bundle adjacent said first endcap.

9. The membrane air dryer according to claim 8, wherein said shell is a hollow tube.

10. The membrane air dryer according to claim 8, wherein said interior of said hollow fibers are blocked from fluid communication with the exterior of said hollow fibers by potting compound.

11. The membrane air dryer according to claim 10, wherein the sweep gas inlet comprises a plurality of short hollow fibers, said plurality of short hollow fibers being embedded in said potting compound in said second end of said hollow fiber bundle.

12. The membrane air dryer according to claim 8, wherein said first endcap has an outer wall, said outer wall of said first endcap having a narrowed portion about the periphery of said first endcap.

13. The membrane air dryer according to claim 12, wherein said narrowed portion of said outer wall is formed by an inner parametric groove in the inner surface of said outer wall of said first endcap and an outer parametric groove in the outer surface of said outer wall of said first endcap.

14. The membrane air dryer according to claim 13, wherein the inner diameter of said inner parametric groove is substantially the same as the outer diameter of said shell.

15. The membrane air dryer according to claim 13, further comprising a tubular sweep collar, said sweep collar being disposed immediately adjacent to said first endcap and fitting into said outer parametric groove of said first endcap.

16. The membrane air dryer according to claim 15, wherein said sweep air outlet is formed from a portion of said tubular sweep collar.

17. The membrane air dryer according to claim 8, wherein said second endcap has an outer wall, said outer wall of said second endcap having a narrowed portion about the periphery of said second endcap.

18. The membrane air dryer according to claim 17, wherein said narrowed portion of said outer wall is formed by an inner parametric groove in the inner surface of said outer wall of said second endcap and an outer parametric groove in the outer surface of said outer wall of said second endcap.

19. The membrane air dryer according to claim 18, wherein the inner diameter of said inner parametric groove is substantially the same as the outer diameter of said shell.

20. The membrane air dryer according to claim 19, further comprising a tubular sweep inlet collar, said sweep inlet collar being disposed immediately adjacent to said second endcap and fitting into said outer parametric groove of said second endcap, and said sweep inlet is formed from a portion of said tubular sweep inlet collar.

21. A membrane air dryer comprising:
   a) a shell,
   b) a bundle of hollow fibers scaling mounted within said shell so that the interior of said hollow fibers is blocked from fluid communication with the exterior of said hollow fibers,
   c) a first endcap sealingly mounted at one end of said shell to provide a first plenum adjacent a first end of said bundle of hollow fibers, said first endcap having an inlet in fluid communication with said first plenum,
   d) a second endcap sealingly mounted at one end of said shell to provide a second plenum adjacent a second end of said bundle of hollow fibers, said second endcap having an outlet in fluid communication with said second plenum, and said second plenum being in fluid communication with the interior of said hollow bundle,
   e) a sweep air outlet in fluid communication with the exterior of said hollow bundle adjacent said first endcap.
   f) a sweep inlet in fluid communication with the exterior of said hollow bundle adjacent said second endcap,
   g) an excess sweep inlet providing fluid communication between an external source of sweep air and the interior of the hollow fiber bundle adjacent said second endcap, and a secondary sweep outlet in fluid communication with the exterior of said hollow bundle adjacent said first endcap, and
   h) a solenoid valve, said solenoid valve bet configured to control flow of sweep through said sweep and excess sweep inlets.

* * * * *